Jan. 5, 1926.
C. F. ERNST
1,568,146
SAW ATTACHMENT FOR VEHICLES
Filed Feb. 2, 1925　　2 Sheets-Sheet 1
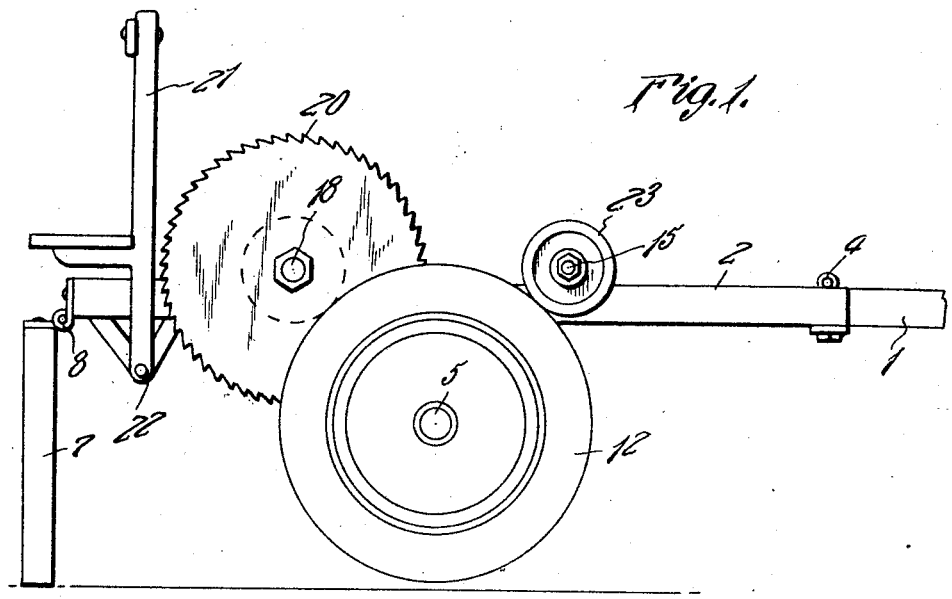
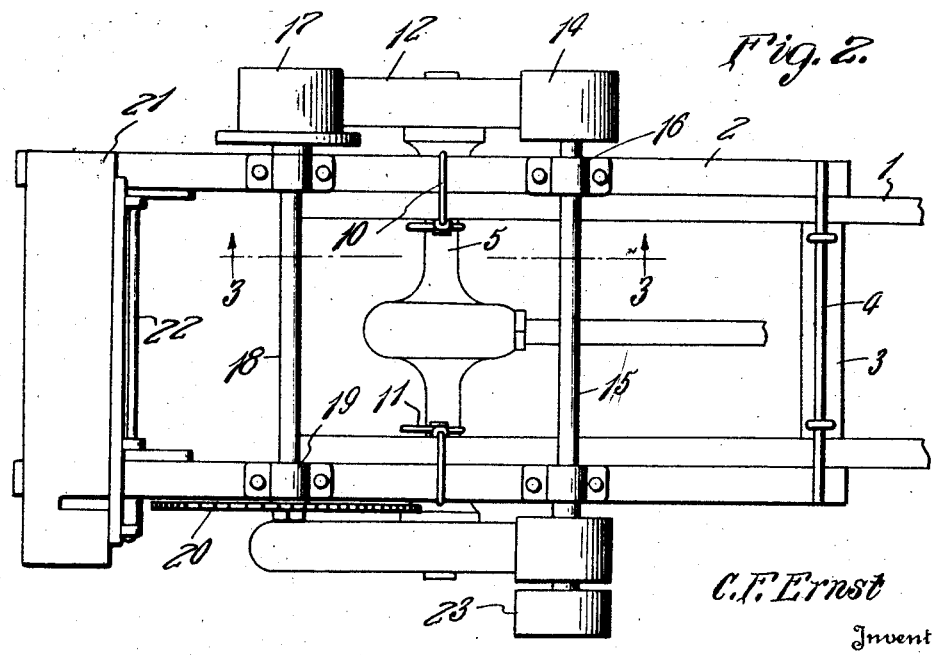
C. F. Ernst
Inventor
By　　　Attorney Jan. 5, 1926.  1,568,146
C. F. ERNST
SAW ATTACHMENT FOR VEHICLES
Filed Feb. 2, 1925    2 Sheets-Sheet 2
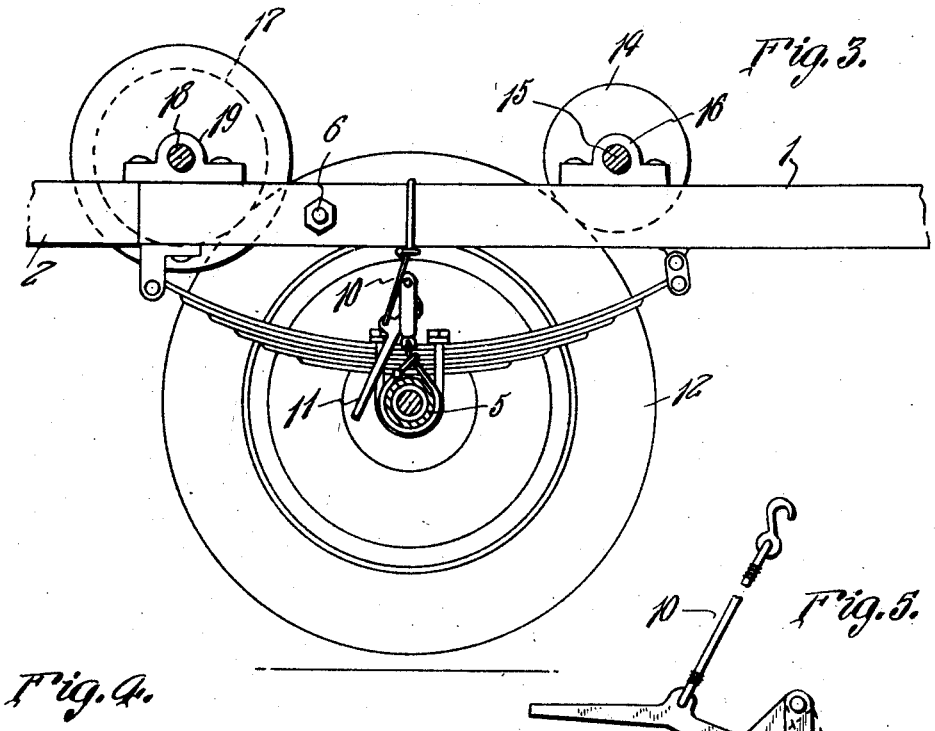
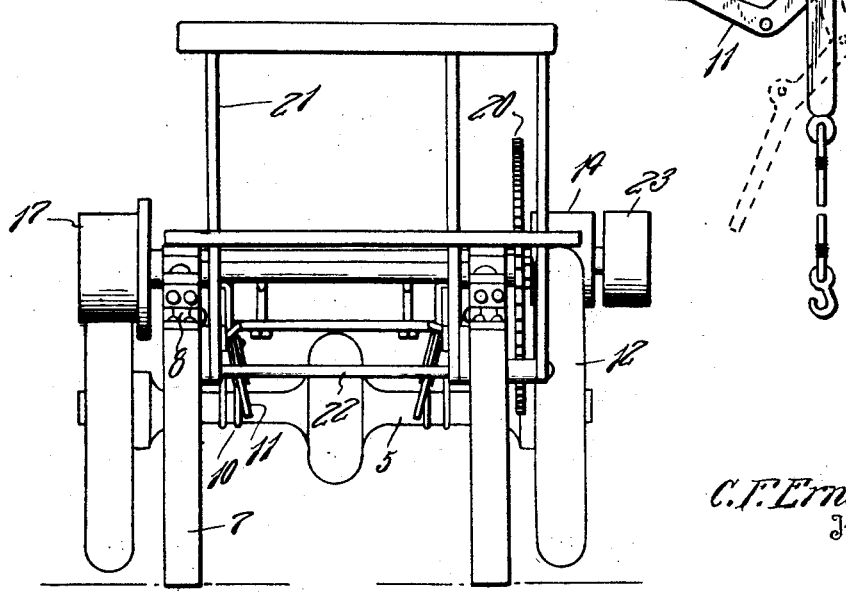

Patented Jan. 5, 1926.

1,568,146

UNITED STATES PATENT OFFICE.

CHRISTIAN F. ERNST, OF MANCHESTER, MICHIGAN.

SAW ATTACHMENT FOR VEHICLES.

Application filed February 2, 1925. Serial No. 6,480.

*To all whom it may concern:*

Be it known that I, CHRISTIAN F. ERNST, a citizen of the United States of America, residing at Manchester, in the county of Washtenaw and State of Michigan, have invented new and useful Improvements in Saw Attachments for Vehicles, of which the following is a specification.

The purpose of the invention is to provide a device to be employed as an attachment for use in connection with motor vehicles so that the power of the engines of the latter may be utilized to operate the device.

With this purpose in view, the invention consists in the construction and combination of parts of which a preferred embodiment is illustrated in the accompanying drawings, wherein:

Figure 1 is a side elevational view showing the apparatus in operative position on a motor vehicle.

Figure 2 is a top plan view.

Figure 3 is a side elevational view showing the folded position of the apparatus when not in use.

Figure 4 is a central longitudinal sectional view on the line 4—4 of Figure 1.

Figure 5 is a view illustrating the jack lever and connecting cable by which the vehicle springs are compressed to contact the driving wheels of the latter with the operating rolls of the device.

Designed as a semi-permanent attachment to a motor vehicle such as that indicated at 1 in the drawings, the invention comprises a frame consisting of the longitudinal beams 2 connected at their forward ends by a transverse plate 3 by which the beams at their forward ends are secured to the chassis frame of the vehicle by means of a clamp 4. The beams extend rearwardly over the rear axle 5 of the vehicle, being clamped to the chassis frame, as indicated at 6, and at their rear ends carry the legs or standards 7 hingedly connected with them, as at 8. When the legs are swung to a position of perpendicularity with the beams, in which position they abut end on against the under faces of the beams, they serve to elevate the vehicle frame to a position above its normal height and thus the rear axle remains suspended on the vehicle springs.

In order to collapse the vehicle springs, the beams and the axle 5 are connected by flexible members such as the cables 10, the terminals of which are engaged with jack levers 11 which, when actuated, serve to reduce the effective length of the cables and thus compress the springs, elevating the driving wheels 12 to bring the latter in contact with idler rolls 14 carried on a transverse shaft 15 journaled in bearings 16. The shaft 15 is disposed ahead of the axle and the idler rolls contacting with the driving wheels prevent the differential from functioning and thus results in the communication of motion from one of the driving wheels to a friction roll 17 carried on a shaft 18 journaled in bearings 19. The shaft 18 is disposed behind the rear axle and at the end remote from the friction roll 17 carries a circular saw 20 which may be employed for cutting off cord wood or for whatever other purpose the saw may be utilized, an oscillatory rack 21 being mounted on a transverse shaft 22 swung from the beams and adapted to hold logs or other pieces of lumber to be split or cut off by the saw.

A pulley 23 is carried on the shaft 15 adjacent the friction roll for the application of a belt in transmitting motion to any other machinery that it may be desired to drive The hinge connections 8 are separable so that the legs or standards may be removed when the device is not in use and it is desired to use the vehicle for transportation purposes. Under such conditions, the shafts carrying the saw and idler rolls may also be removed as well as the work rack, thus leaving only the beams attached to the vehicle The invention having been described, what is claimed as new and useful is:

1. A device for the purpose indicated comprising in combination with a vehicle having a chassis frame, of beams carried by the frame, a tool shaft spanning the beams, and means engaging the beams and the vehicle axle for elevating the latter, the tool shaft having a friction roll for engagement with one of the driving wheels of the axle.

2. A device for the purpose indicated comprising in combination with a vehicle having a chassis frame, of beams carried by the frame and extending over and rearwardly of the rear axle, a shaft spanning the beams forwardly of the rear axle and provided with idler rolls, a tool shaft transversely spanning the beams and disposed rearwardly of the axle and provided with a friction roll, and means connecting the beams with the axle and operable to compress the vehicle springs to elevate the vehicle wheels into contact with the idler rolls and to peripherally engage one of them with the friction roll.

3. A device for the purpose indicated comprising in combination with a vehicle having a chassis frame and a rear driving axle and driving wheels carried by the axle, beams connected to the chassis frame and extending rearwardly over the axle, a tool shaft spanning the beams and provided with a fricton roll, and cables extending around the beam and the axle and provided with jack levers for contracting the cables and elevating the axle for contact of one of its driving wheels with the friction roll.

4. A device for the purpose indicated comprising in combination with a vehicle having a chassis frame and driving wheels, beams connected with the frame and extending rearwardly of the vehicle, a tool shaft adapted for operative connection with one of the driving wheels, and legs or standards having hinged connections with the beams at their rear ends and adapted, when positioned perpendicularly with reference to the beams, to elevate the driving wheels out of contact with the ground.

5. A device for the purpose indicated comprising in combination with a vehicle having a chassis frame and driving wheels, beams connected with the frame and extending rearwardly of the vehicle, a tool shaft adapted for operative connection with one of the driving wheels, and legs or standards having hinged connections with the beams at their rear ends and adapted, when positioned perpendicularly with reference to the beams, to elevate the driving wheels out of contact with the ground, said hinged connections being separable to permit removal of the legs when not supporting the weight of the chassis of the vehicle.

In testimony whereof he affixes his signature.

CHRISTIAN F. ERNST.